United States Patent
Windhausen et al.

(10) Patent No.: US 7,866,692 B2
(45) Date of Patent: Jan. 11, 2011

(54) GAS GENERATOR FOR A VEHICLE PASSENGER PROTECTION DEVICE AND PROCESS FOR REMOVING SOLIDS AND LIQUID BURNED RESIDUES IN A GAS STREAM

(75) Inventors: Björn Windhausen, Goldbach (DE); Heiko Kratz, Kronberg (DE)

(73) Assignee: Takata-Petri AG, Aschaffenburg (DE)

(*) Notice: Subject to any disclaimer, the term of this patent is extended or adjusted under 35 U.S.C. 154(b) by 0 days.

(21) Appl. No.: 12/656,066

(22) Filed: Jan. 14, 2010

(65) Prior Publication Data

US 2010/0117344 A1    May 13, 2010

Related U.S. Application Data (63) Continuation of application No. PCT/EP2008/059216, filed on Jul. 15, 2008.

(30) Foreign Application Priority Data

Jul. 16, 2007   (DE) .................. 10 2007 033 344

(51) Int. Cl.
   *B60R 21/264*   (2006.01)
(52) U.S. Cl. .................. 280/736; 280/741; 280/742; 102/531
(58) Field of Classification Search .................. 280/736, 280/740, 741, 742; 102/530, 531
   See application file for complete search history.

(56) References Cited

U.S. PATENT DOCUMENTS

| | | | |
|---|---|---|---|
| 6,095,558 A | 8/2000 | Bayer et al. | |
| 6,412,816 B1 | 7/2002 | Gast et al. | |
| 2003/0184067 A1* | 10/2003 | Karray et al. | 280/741 |
| 2004/0145166 A1* | 7/2004 | Smith | 280/736 |

FOREIGN PATENT DOCUMENTS

| | | |
|---|---|---|
| DE | 23 64 268 A1 | 6/1975 |
| DE | 41 21 039 A1 | 1/1993 |
| DE | 42 23 416 A1 | 1/1994 |
| DE | 195 05 580 A1 | 8/1996 |
| DE | 197 16 652 A1 | 10/1998 |
| DE | 199 03 237 A1 | 8/2000 |
| DE | 20 2004 012 722 U1 | 2/2005 |
| EP | 0 808 258 B1 | 11/1997 |
| EP | 0 873 917 A2 | 10/1998 |
| JP | 2001-39261 A | 2/2001 |

* cited by examiner

*Primary Examiner*—Paul N Dickson
*Assistant Examiner*—Joseph Rocca
(74) *Attorney, Agent, or Firm*—Foley & Lardner LLP

(57) ABSTRACT

A gas generator for a vehicle passenger protection device. The gas generator includes a combustion chamber in which a gas-generating charge is arranged. A conical deposition chamber is provided that has a first wall, within which a plurality of gas through-holes are formed, and at least one second wall which extends at an angle from the first wall and within which at least one blow-off hole is formed. Gas generated inside the combustion chamber enters the deposition chamber through the gas through-holes and leaves the deposition chamber through the at least one blow-off hole.

17 Claims, 8 Drawing Sheets

GAS GENERATOR FOR A VEHICLE PASSENGER PROTECTION DEVICE AND PROCESS FOR REMOVING SOLIDS AND LIQUID BURNED RESIDUES IN A GAS STREAM

CROSS-REFERENCE TO RELATED PATENT APPLICATIONS

This application is a Continuation of International Application No. PCT/EP2008/059216, filed Jul. 15, 2008, which was published in German on Jan. 22, 2009 as WO 2009/010504 A1. The foregoing International Application is incorporated herein by reference in its entirety.

BACKGROUND

The application relates to a gas generator for a vehicle passenger protection device and a process for removing solids and liquid burned residue in a gas stream.

During burning off a gas generating charge of a gas generator usually solids and/or liquid burned-off residues are generated which are contained in the gas stream. In order to prevent an emission of these solids and liquid burned-off residue into the surrounding, and therefore for instance into an airbag, a filtering of the gas stream with wire mesh filters, expanded metal filters, sintered metal filters or a combination of said filtering techniques is known. An enlarged surface of the filter thereby enables good heat absorption and therefore cooling of the gas stream and offers the possibility of filtering the burned-off residues. The use of filters, however, can lead to an increased weight, an increased installation space, non-defined flow rates and an increased production cost.

A gas generator is known from EP 0 808 258 B1 (incorporated by reference herein) in which the gas stream produced by a gas generating charge is guided from a combustion chamber into an expansion chamber which is formed by a deposition chamber and a filter chamber.

An object of at least one disclosed embodiment is to provide a gas generator and a process for removing solids and liquid burned-off residues in a gas stream which effectively deposit solids and liquid burned-off residues from the gas stream of a gas generator without the requirement of using filters.

SUMMARY

According to an embodiment, a gas generator with a conically formed deposition chamber is provided which has a first wall, in which a number of gas through-holes are formed, and at least a second wall which is arranged in an angle to the first wall, in which at least one blow-off hole is formed. Gas produced in the burning chamber passes through the gas through-holes into the deposition chamber and leaves it through the at least one blow-off hole. The conical shape of the deposition chamber effects that the gas stream undergoes a pressure drop while passing the deposition chamber, wherein the velocity of the gas stream is reduced. A reduction of the velocity of the gas stream increases the efficiency of the deposition of solids and liquid burned-off residues of the gas stream in the separator.

"Conically" shall be understood any spatial structure which tapers towards at least one spatial direction. An example for a conic arrangement is a geometric arrangement which has two walls or side walls arranged in an angle to each other. Thereby, the walls or side walls may be curved and for instance circular designed.

It is provided in an embodiment that the deposition chamber is designed such that the gas stream strikes at least one wall of the deposition chamber after passing through the gas through-holes and subsequently undergoes a redirection. The gas stream undergoes after such a first redirection a pressure drop caused by the conicity of the deposition chamber, wherein the velocity of the gas stream is reduced.

In a further embodiment the deposition chamber is designed such that the gas stream after passing through the gas through-holes strikes a second wall of the deposition chamber, where it undergoes a redirection, subsequently strikes a third wall of the deposition chamber, where it undergoes a second redirection, and then leaves the deposition chamber through the at least one blow-off hole. During each strike of the gas stream on an adjacent wall solids, like hot burned particles and liquid burned-off residues, are deposited. Furthermore, cooling processes occur. Thus, energy and particles are withdrawn from the gas stream. Solids and liquid burned-off residues are removed effectively from the gas stream by preferably going twice through these processes.

An embodiment provides that the first wall runs angular in respect to the outer geometry of the gas generator. Thereby, the deposition chamber is formed by the first angular running wall, the second wall and a third wall, wherein the second wall is formed by a side wall of the gas generator housing and the third wall is formed by a bottom or cover area of the gas generator housing. For this reason, only the first angular running wall has to be provided for providing the conically formed deposition chamber, which is also designated as a separator. The further walls are formed by the walls of the generator housing. It is also possible to arrange, for instance a side wall of the generator housing in an angular running manner for providing a conicity of the deposition chamber or to form the first and the second wall with a different angular position.

A further embodiment provides that the gas through-holes in the deposition chamber are arranged in an offset manner with respect to the at least one blow-off hole. Offset thereby means that the gas through-holes and the blow-off holes have a different distance to a reference surface. It is for instance provided that the ratio of the distance of the gas through-holes to a bottom or cover area of the gas generator to the distance of the at least one blow-off hole to such a bottom or cover area is larger or equal to 1.5.

In a further embodiment it is provided that the gas through-holes of the first wall are designed such that the gas stream flows out of the first wall essentially in tangential direction into the deposition chamber. Thereby, the first wall is pivotably mounted so that due to the tangential gas emission the first wall and therefore the gas stream starts to rotate.

An embodiment of a process for depositing solids and liquid burned-off residues of a gas stream of a gas generator comprises passing the gas stream through a conically formed deposition chamber wherein the gas stream strikes at least one wall of the deposition chamber and subsequently undergoes a redirection.

BRIEF DESCRIPTION OF THE DRAWINGS

The invention is explained in the following by referring to the Figures on the basis of several exemplary embodiments.

DETAILED DESCRIPTION

Figure 1:
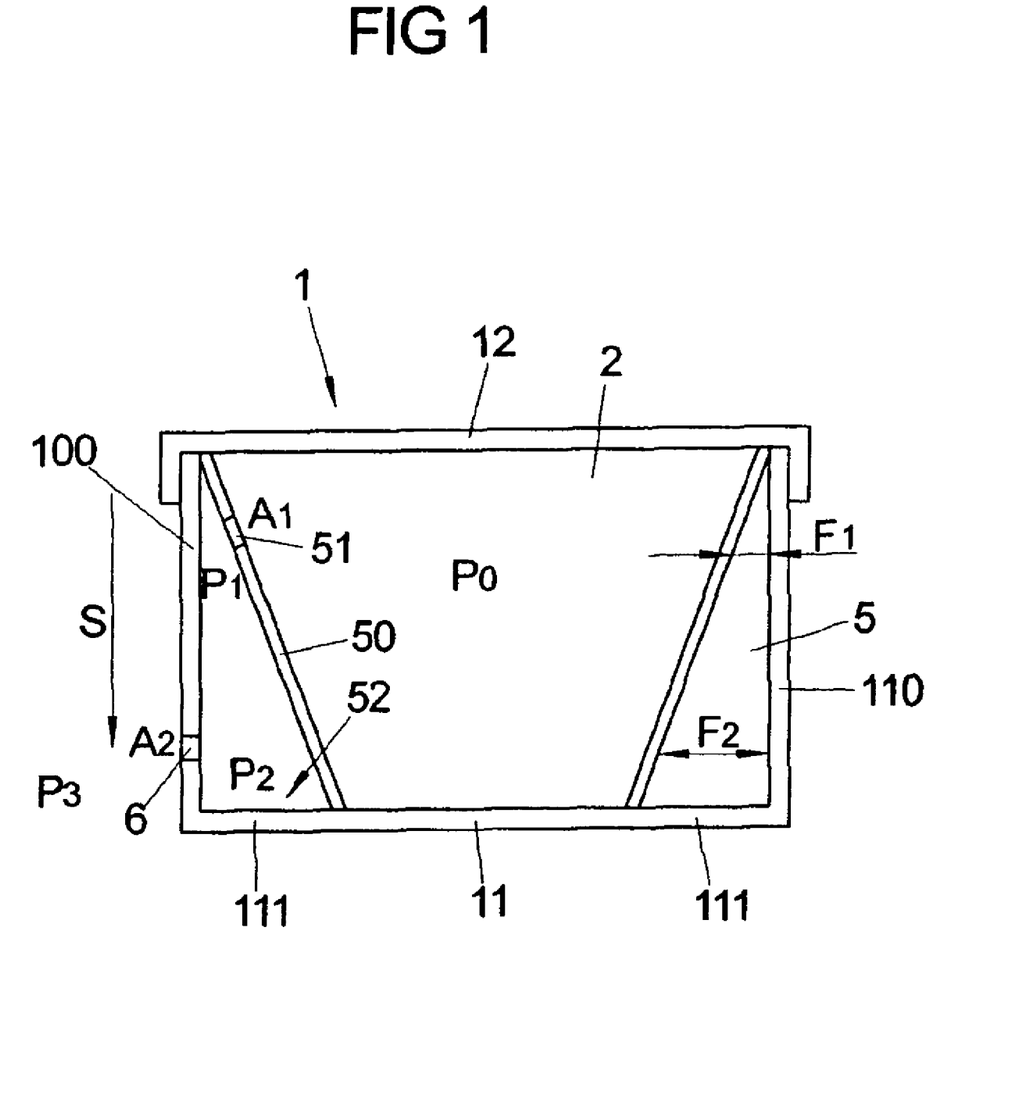
FIG. 1 shows a first embodiment of a gas generator with a conically formed deposition chamber schematically in a sectional view.

FIG. 1 shows a rotationally symmetrical shaped gas generator 1 which has a generator housing consisting of generator pot 11 and a generator cover 12 connected with it. Inside of the generator housing a combustion chamber 2 is formed in which an ignition element, an ignition load and propellant element are arranged (not shown). The gas generator 1 forms furthermore adjacent to the combustion chamber 2 a position chamber 5 which is formed by a deposition wall 50 (first wall) in the following also designated as separator, which is arranged in a angular manner in respect to the outer geometry of the gas generator 1, by side wall 110 of the generator pot 11 (second wall) and by an area 111 of the bottom of the generator pot 11 (third wall). The angular arrangement of the separator 50 is such that a reduction of the cross section towards the generator cover 12 occurs.

Due to the angular arrangement of separator 50, a conical shape of the deposition chamber 5 is provided in the side view wherein the cone tapers into the direction of the generator cover 12. Due to the conical shape the deposition chamber 5 has a smaller cross sectional area in its upper area than in its lower area what is for instance shown by the differently sized cross sectional areas $F_1$ and $F_2$ in FIG. 1. The cross sectional areas $F_1$, $F_2$ continue vertical to the vertical axis, e.g. horizontal. Thereby, $F_2$ is larger than $F_1$.

A number of gas through-holes 51 are arranged in the upper area in the deposition chamber 50 which are for instance formed as holes, elongated holes or dormers. In the side wall 110 of the deposition chamber 5 or the generator pot 11 one or more blow-off holes 6 for the gas stream are formed in the lower area and in vertical direction shifted to the gas through-holes 51. The gas through-holes 51 have a cross section A1 and the blow-off holes 6 a cross section A2 wherein A1 is larger than A2, e.g. the narrowest flow cross-section exist at the blow-off holes 6.

Within the combustion chamber a working pressure $P_0$ exists during the reaction of the gas composition. $P_0$ is a function of the burn-off of the gas generating charge arranged in the combustion chamber 2 and depends on the time. In the deposition chamber 5 a pressure $P_1$ is present in the upper area adjacent to the gas through-holes 51 which indicates the pressure of the gas after passing the separator 50. In addition, the pressure $P_2$ is present in the lower area of the separator 5 before the gas stream leaves through the blow-off holes 6. The ambient pressure after emission of the gas into the surrounding is indicated as $P_3$. It is approximately necessary that at the time point t=0 (before triggering) $P_0$ equals $P_3$.

It is pointed out that the cone of the deposition chamber could taper in an alternative embodiment towards the direction of the bottom of the generator pot 11. The sloping position of the separator 50 would be reflected accordingly. Likewise, the gas through-holes 51 and the blow-off holes 6 would be in accordingly reflected position in such an embodiment.

In the following the function and effect of the gas generator 1 with deposition chamber shown in FIG. 1 is addressed.

After ignition of the gas generating charge arranged in the combustion chamber 2, the pressure $P_0$ in the combustion chamber 2 increases. As a result the produced gas passes from the combustion chamber 2 through the gas through-holes 51 into the deposition chamber 5. This occurs essentially without a pressure loss. Thereby, already a first filter function occurs in so far that the burning solid components of the gas generating charge (which is for instance provided in form of gas tablets) remain in the combustion chamber 2 and are prevented to leave the combustion chamber 2.

It is pointed out that since the cross section A1 of the gas through-holes 51 is larger than the cross section A2 of the blow-off hole 6 no sonic speed occurs at the gas through-holes 51, in fact the gases pass without reaching sonic speed. In the whole gas generator 1 the velocity of the gas stream is below the sonic speed.

By passing through the gas through-holes 51 a moving direction in direction of the restricting lateral generator wall 110 is imprinted onto the gas stream. The hot gas stream strikes on the restricting and cold generator wall 110 with high velocity. When striking, solids like hot burned-off particles and liquid burned-off residues are deposited. Thereby cooling processes occur. Due to condensation and/or adhesion and/or centrifugation material is built up on the inner surface of wall 110. Energy and particles are withdrawn from the gas stream. Temperature and pressure decrease. Pressure $P_1$ is present.

The gas stream is now re-directed by ca. 90° and streams along the broadening cone into the direction of the bottom of the combustion chamber 5. Due to the increasing cross section area of the combustion chamber 5 during this stream (the cross section increases from the cross sectional area $F_1$ to the cross sectional area $F_2$) and since the product between the velocity of the gas stream in the area of the cross sectional area $F_1$ and the cross sectional area $F_1$ equals the product of the velocity of the gas stream in the area of the cross sectional area $F_2$ and the cross sectional area $F_2$, the velocity of the gas stream essentially decreases, e.g. the gas stream is slowed down. Therewith, a pressure drop along the direction corresponds.

In the lower area the combustion chamber 5 forms an undercut 52 in which the gas stream is swirled. Additionally, it is again steered against an adjacent wall, here in the area 111 of the bottom section of the generator pot 11. The explained mechanism of deposition and cooling gains momentum for another time.

The preceding reduction of the velocity of the gas stream in the direction S increases thereby the efficiency of cooling and deposition, since solids and liquid burned-off residues can be more easily withdrawn from the gas stream by condensation etc. due to the lower gas velocity. Hence, the lower gas velocity leads to a lower temperature, which again enables an easier condensation and deposition.

The purified and cold gases experience now anew a redirection of about 90° and are emitted through the blow-off holes 6 into the surrounding following the pressure drop. Since the off-blow holes 6 have the narrowest cross section A2 in the whole gas generator, the flow within the blow-off holes 6 are accelerated to sonic speed. This is related to the fact that the blow-off holes 6 form approximately a Laval nozzle, which leads to an accelerated flow. In case of the Laval nozzle a subsonic speed is present before the nozzle, sonic speed inside the nozzle and supersonic speed after the nozzle, wherein the gas stream is however fast decelerated after the nozzle.

Figure 7:
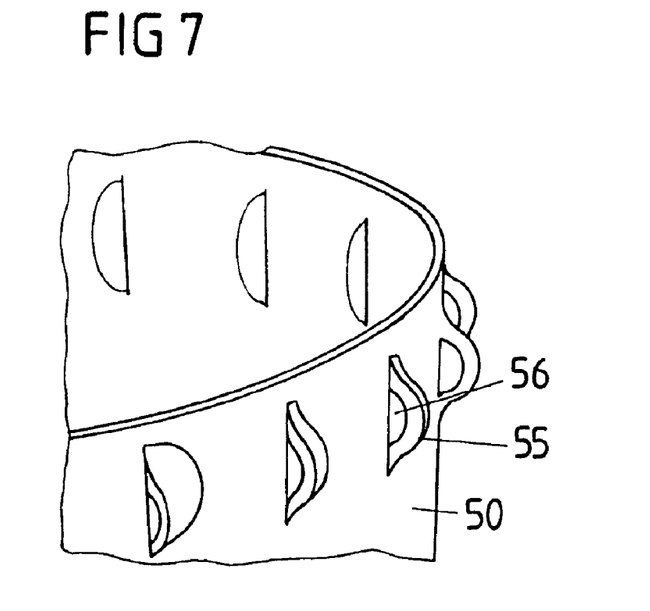
FIG. 7-8 show dormers formed in the area of a deposition wall of a deposition chamber.
Figure 8:
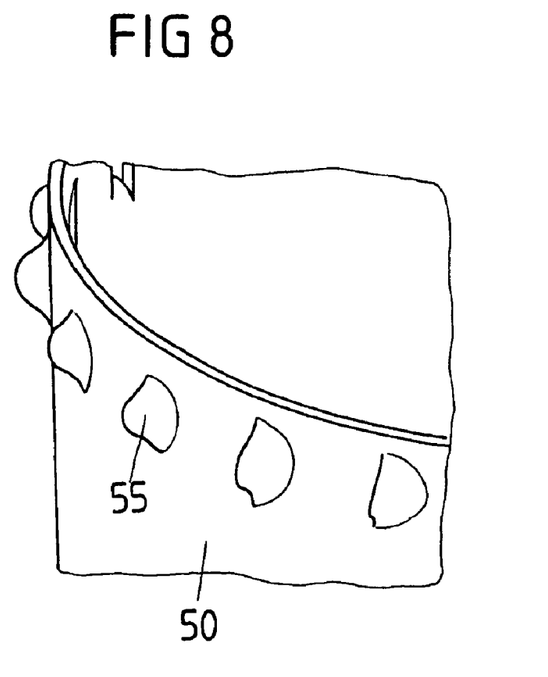

Additionally, it can be provided that the gas stream is made to rotate around a middle axis of the gas generator 1. Such a rotation can result by a tangential direction of the gas stream and the gas through-holes 51 (as it will be explained later on FIGS. 7 and 8) or by a drive unit. A rotation of the gas stream increases the distance until the gas stream interacts with an adjacent wall 110 and therefore improves the depositing and cooling processes.

Figure 2:
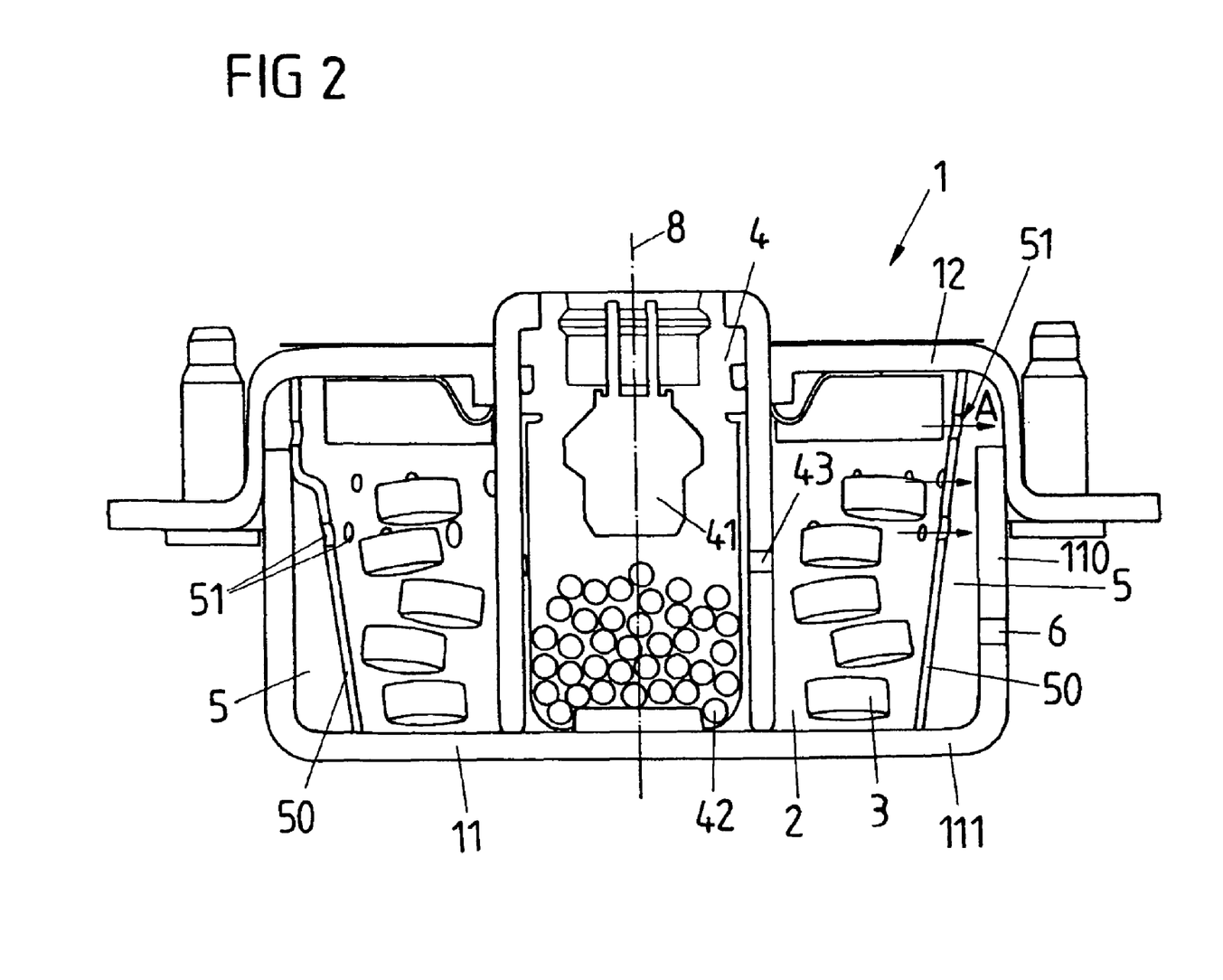
FIG. 2 shows a second embodiment of the gas generator with a conically formed deposition chamber in a partly cutaway view.

FIG. 2 shows a further embodiment of a gas generator 1. The gas generator 1 is rotationally symmetrical shaped and has a centrical axis 8. A schematically shown combustion chamber 2 is provided in which a multitude of gas tablets 3 are arranged. Furthermore, an ignition chamber 4 is centrically provided in which an ignition element 41 and an ignition charge 42 consisting of pellets are arranged. The ignition chamber 4 can be part of the combustion chamber 2 or can be separated from this by a wall provided with openings 43. Furthermore, a deposition chamber 5 with an angular running separator 50 with gas through-holes 51 is provided.

The arrangement is surrounded by a generator housing consisting of a generator pot 11 and a generator cover 12. In the area of a deposition chamber 5 a bottom section 111 of the bottom of the generator pot 11 and a side wall 110 of the generator pot 11 are present. In the side wall 110 one or several blow-off holes 6 are provided. The design of the deposition chamber 5 corresponds basically to the design of the deposition chamber of FIG. 1.

The function and effectiveness of the gas generator 1 and the deposition chamber 5 correspond to the function and effectiveness as described in respect to FIG. 1. Additionally, the following is noted.

The ignition means 41 ignites after applying a potential onto the ignition charge 42 in a known manner. A thus produced ignition jet ignites the propellant tablets 3. The pressure increase connected with the burning of the propellant tablets 3 leads to an overflow of the gas stream from the combustion chamber 2 into the deposition chamber 5 wherein hot gases with solids and liquid burned-off residues pass through the gas through-holes 51 of the separator 50 and reach the deposition chamber 5. This is indicated by the arrows A in FIG. 2.

Figure 3:
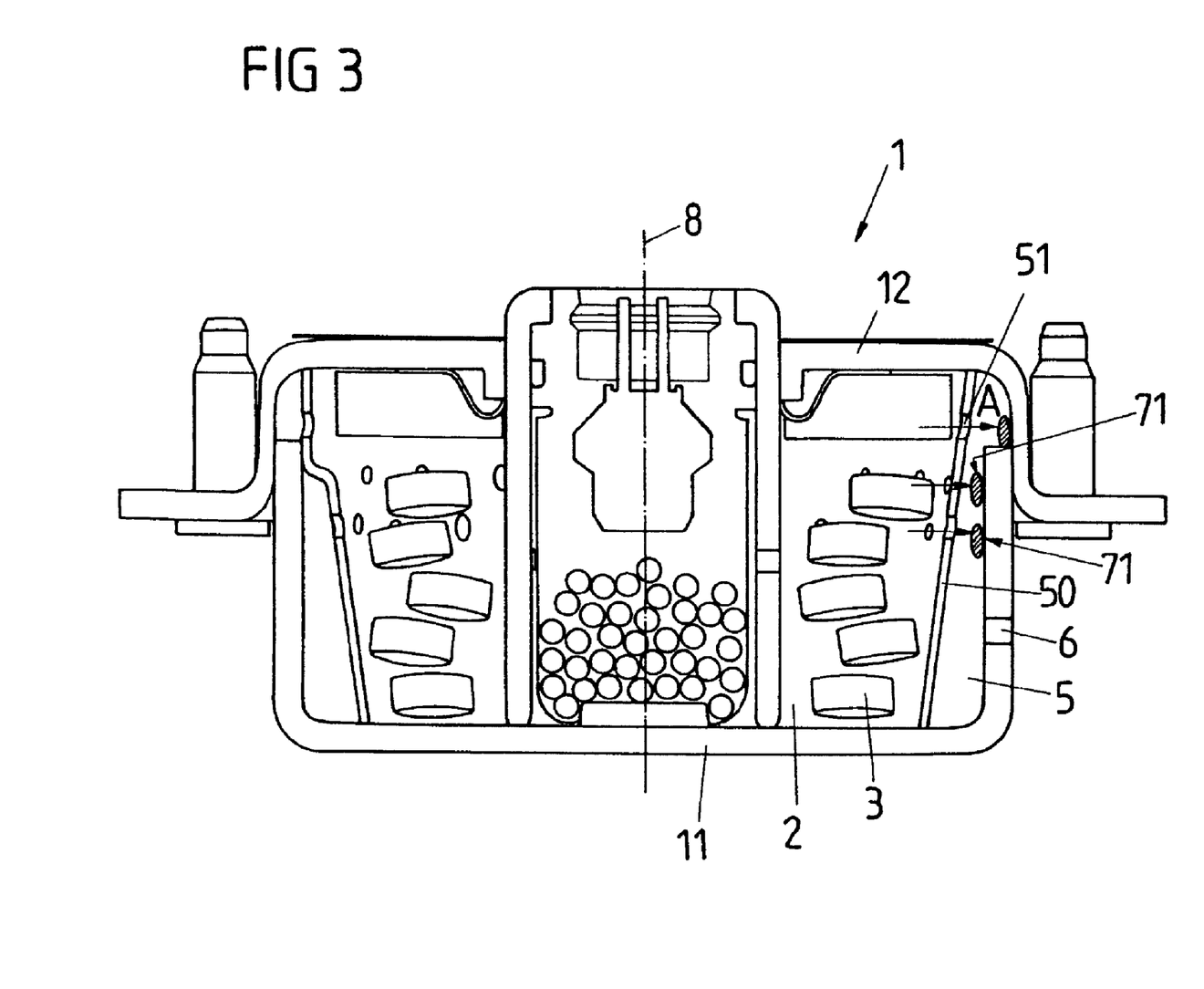
FIG. 3-6 show the gas generator of FIG. 2, wherein different phases of gas distribution are shown.

The hot gases provided with solids and liquid burned-off residues strike after passing the separator 50 the adjacent wall 110 of the gas generator in a first impact area 71. Thereby solids and liquid burned-off residues are deposited, wherein condensation processes occur to some extend on the cold walls of the adjacent wall 110, compare FIG. 3.

In a preferred, but not necessary embodiment, it is provided that the hot gases while passing the gas through-holes 51 make the separator 50 rotate around the axis 8. Therefore, the gas through-holes 51 are for instance formed as dormers 55 according to the FIGS. 7 and 8, whose openings 56 allow leaving the passing gas in tangential direction out of the dormers 55. The associated blow-back causes a rotation of the separator 50 pivotal mounted in this case. Thereby the effect occurs that the gas stream is also made to rotate and experiences centrifugal forces. This leads to an improved deposition of solid and liquid gas components and an improved cooling. It is however pointed out that the rotation of the separator 50 is only one option and does not have necessarily to be implemented. It is also pointed out that the rotation can also be provided in a different manner, for instance by a drive unit. In such a case it is provided in one embodiment, that the drive unit rotates the separator 50 opposite to the direction of the blow-back which the separator encounters by the tangentially leaving gas. This leads to intensified deposition and cooling.

Figure 4:
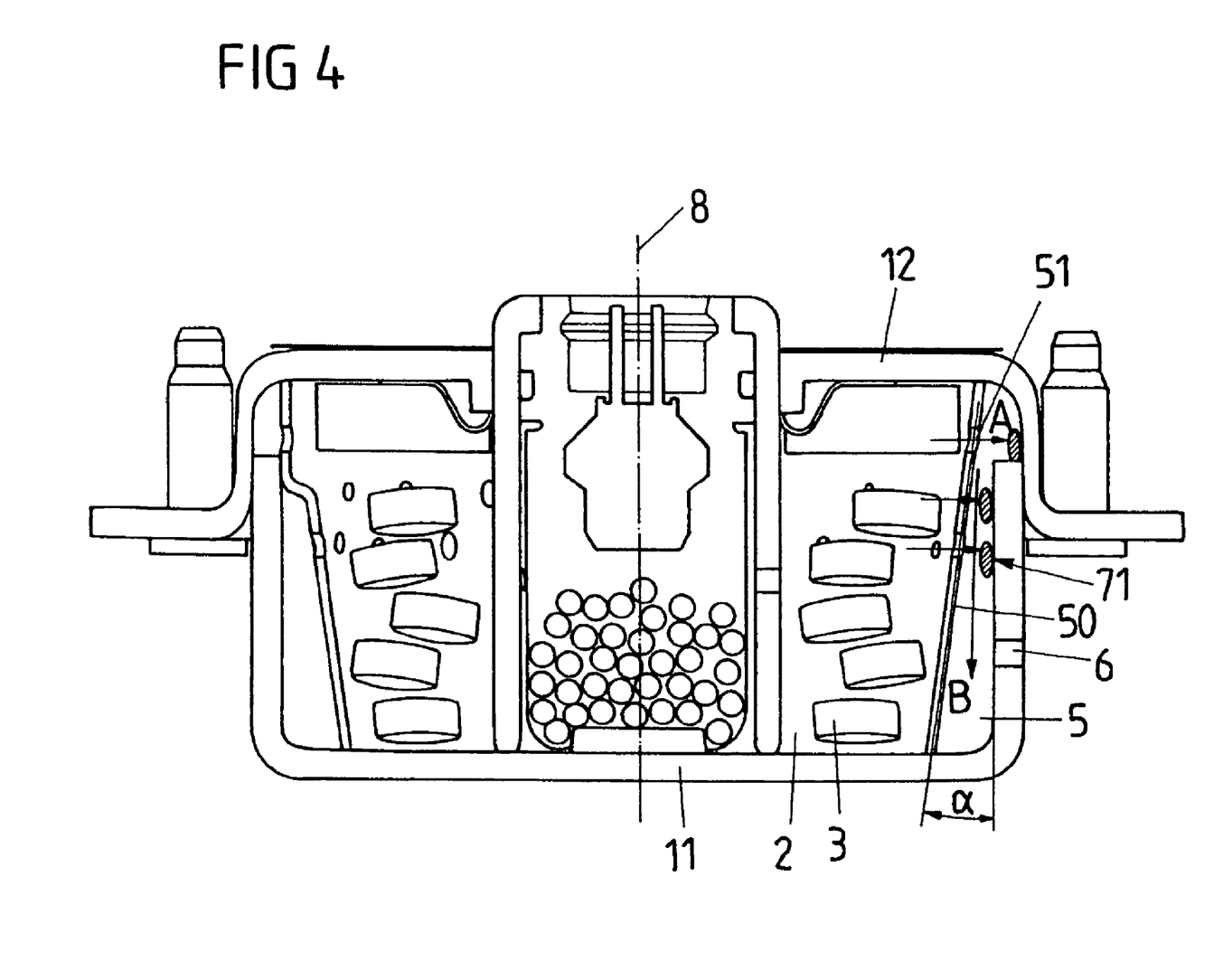

According to FIG. 4 the still hot gases with still remaining solids and liquid burned-off residues follow the pressure drop and are accordingly re-directed approximately about 90° as shown by arrow B. The pressure drop is intensified by the cone shape of the deposition chamber 50, wherein the stream is decelerated as explained in respect to FIG. 1.

Figure 5:
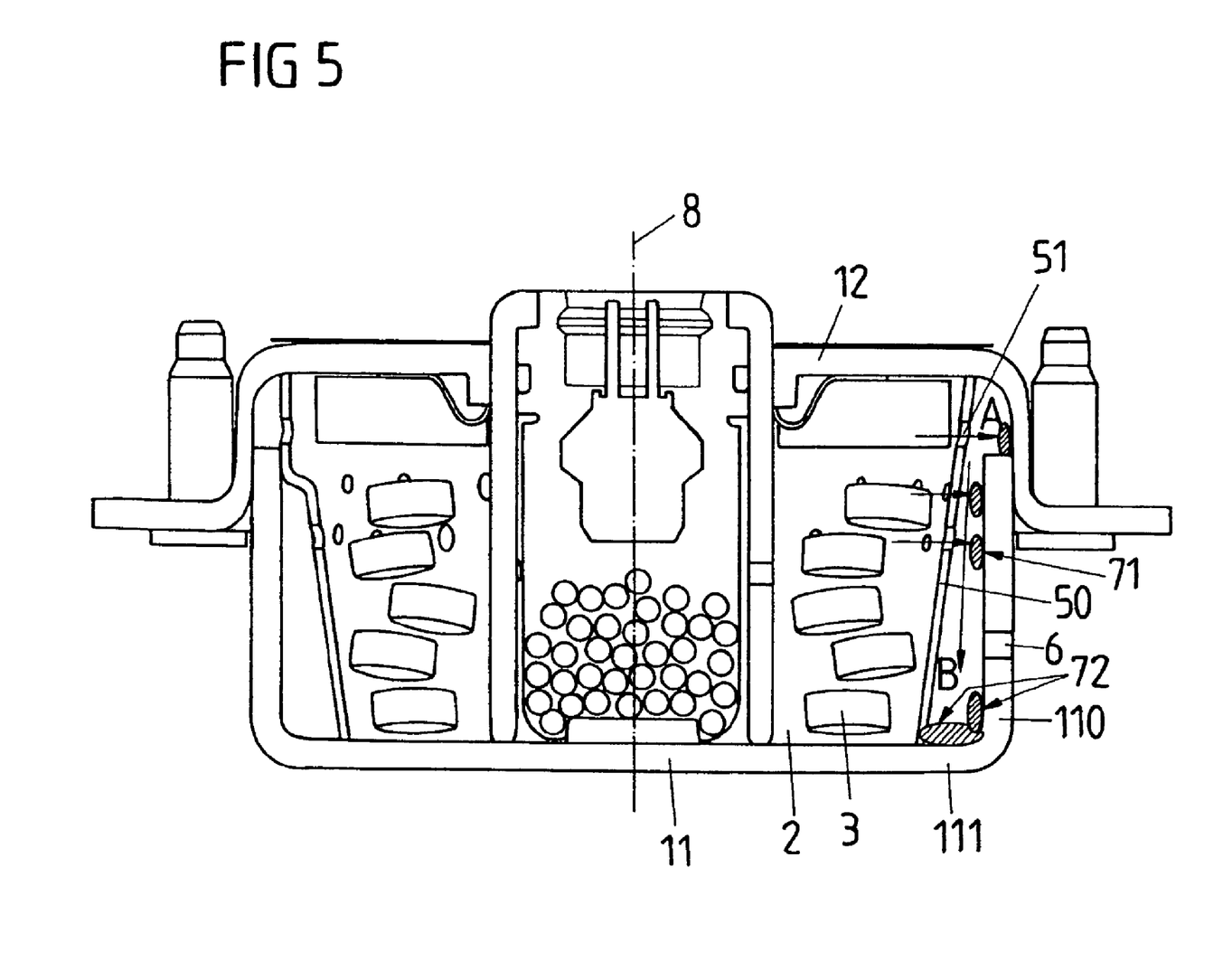

According to FIG. 5 the re-directed gases strike a further adjacent wall in a second impact area 42, namely the bottom section 111 and lower areas of the side wall 110. In this second impact area 42 solids and liquid burned-off residues are deposited anew and a cooling process occurs again. The deposited substances can appear as a precipitate on the adjacent wall 111, 110 of the gas generator 1.

Figure 6:
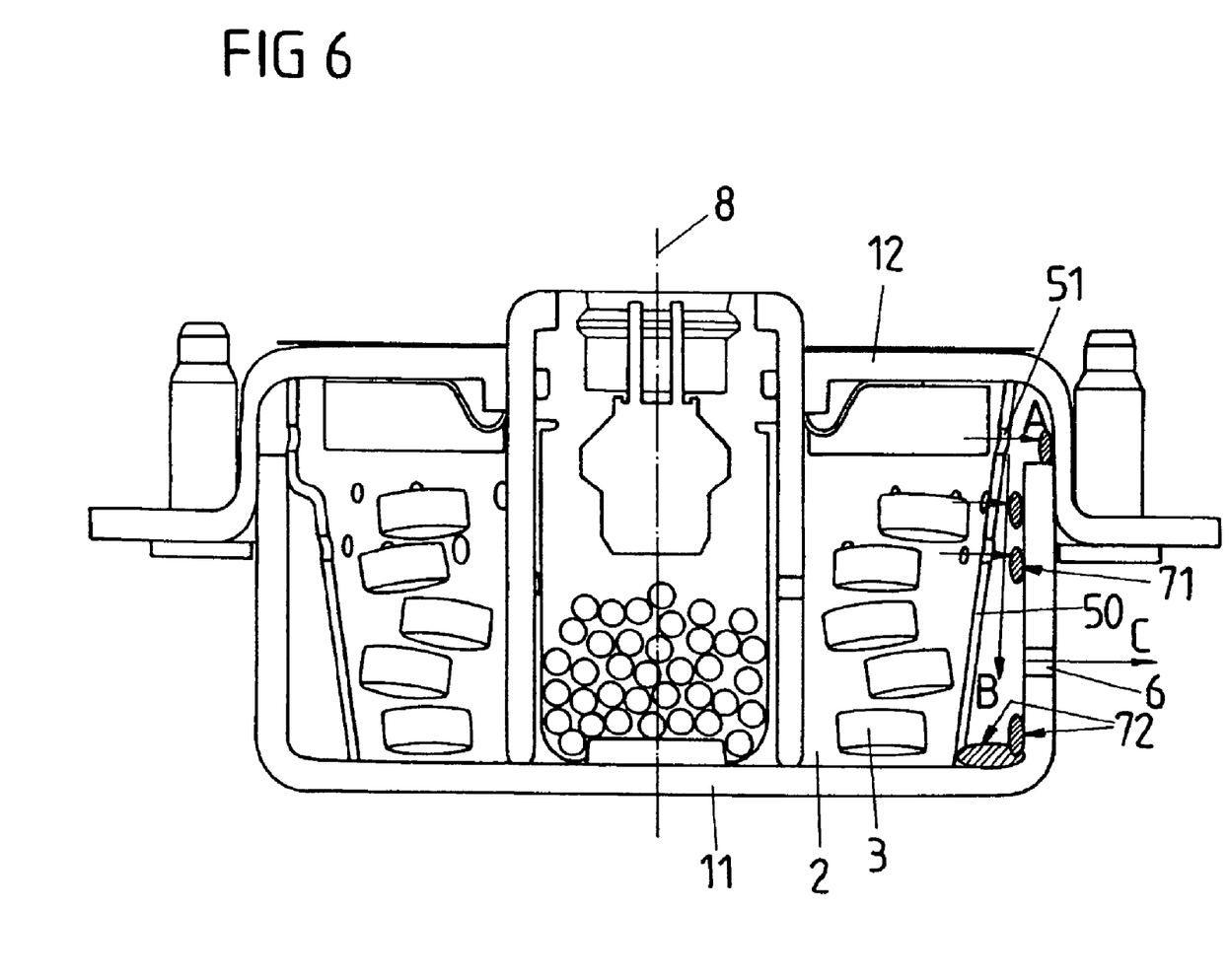

According to FIG. 6 and the shown arrow C the gases leave the generator housing after the anewed deposition of solids and liquid burn residues following the pressure drop wherein the gasses stream through the blow-off holes 6 and preferably experience an acceleration up to and over sonic speed during discharge.

Figure 9:
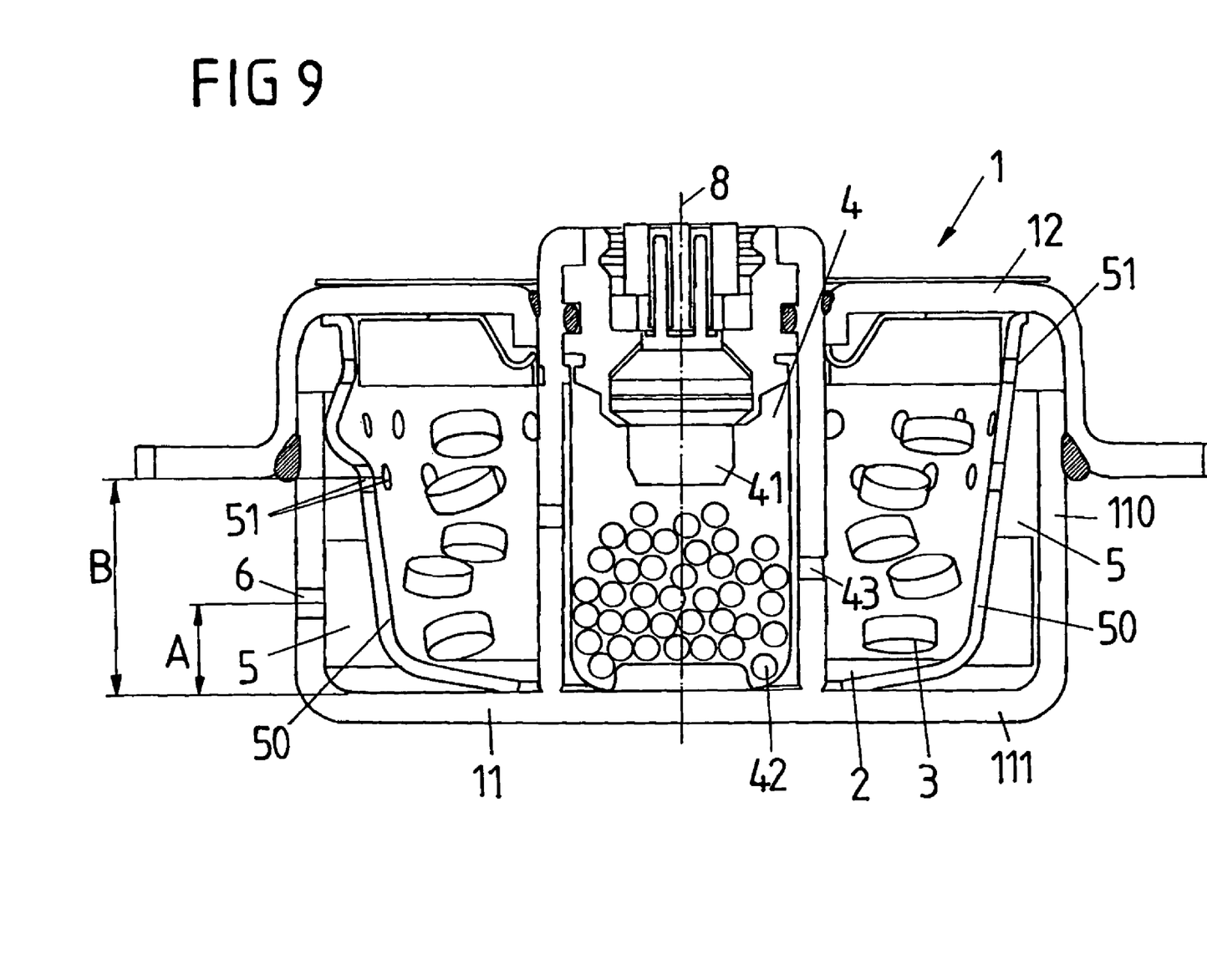
FIG. 9 shows a gas generator according to the gas generator of FIG. 2, wherein the distance between gas through-holes and blow-off holes of a gas generator are illustrated.

FIG. 9 shows a gas generator 2 according to FIG. 2 wherein additionally the shift between the gas through-holes 51 and the blow-off holes 60 is indicated. All gas through-holes 51 are thereby arranged in a shifted manner to the blow-off holes 6. Thereby the blow-off holes 6 are formed in the lower area of the deposition chamber 5 which has a larger cross sectional area than upper areas in which the gas through-holes 51 are formed.

In FIG. 9 A indicates the distance of the blow-off holes 6 to bottom 111 of the generator pot 11. Thereby, the distance of the centre of the blow-off holes 6 to the inner surface of bottom 111 is looked at. Furthermore, B indicates the distance of a gas through-hole 51 to the bottom 111 of the generator pot 111. It is again looked at the distance of the centre of the gas through-hole 51 to the inner surface of bottom 111. It is now provided that the shift between the blow-off hole 6 and the gas through-hole 51 is dimensioned such that B divided by A is larger or equal to 1.5: $B/A \geq 1.5$.

This ratio $B/A \geq 1.5$ is valid for all blow-off holes 6 and gas through-holes 51. It is particular provided in the embodiment of FIG. 9 that the blow-off holes 6 are arranged in a horizontal level in respect to the centre axis 8. It is furthermore provided that the gas through-holes 51 are arranged in several levels or rows. The distance B indicates thereby the distance of a gas through-hole 51 to bottom 111 which is arranged in a level of gas through-holes which have the lowest distance to bottom 111. The mentioned ratio $B/A \geq 1.5$ is also of course valid for gas through-holes, which are arranged in overlying levels since with increasing value for B also the ratio B/a increases.

It is pointed out that the arrangement of the gas through-holes 51 in several levels is only exemplary. Likewise, the gas through-holes 51 can be arranged in only one level or irregularly. The blow-off holes 6 can also be formed in several levels instead in one level or irregularly.

Alternatively, the edge formed by the bottom 111 with the side wall 110 can be seen as reference centre for the distances A, B instead of bottom 111. It is then essential that the ratio of the distance B of a gas through-hole 51 to this edge to the distance A of a blow-hole 6 to this edge is larger or equal 1.5

The invention is not restricted in its definition to the above-mentioned embodiments. For example the exact design of the combustion chamber is not limited. It can also be provided that the deposition chamber is part of the combustion chamber or is located outside of the combustion chamber without forming a common wall with the same. Furthermore, the conical tapering of the deposition chamber in FIGS. 1 to 6 is only to be understood as an example. A conical tapering can for instance also occur into another direction.

The priority application, German Priority Application DE 10 2007 033 344.9, filed Jul. 16, 2007, including the specification, drawings, claims and abstract, is incorporated herein by reference in its entirety.

What is claimed is:

1. A gas generator for a vehicle passenger protection device comprising:
   a combustion chamber in which a gas-generating charge is arranged;
   a conical deposition chamber comprising:
      a first wall,
      a plurality of gas through-holes formed in the first wall,
      a second wall which extends at an angle from the first wall,
      at least one blow-off hole formed in the second wall,
      a third wall; and
   a gas generator housing;
   wherein the second wall is formed by a side wall of the gas generator housing;
   wherein the third wall is formed by a bottom or cover area of the gas generator housing; and
   wherein the gas generator is configured such that gas generated inside the combustion chamber enters the deposition chamber through the gas through-holes, the gas after streaming through the gas through-holes strikes the second wall of the deposition chamber, the gas thereby undergoing a redirection, the gas subsequently strikes the third wall of the deposition chamber, the gas thereby undergoing a further redirection, and the gas then leaves the deposition chamber through the at least one blow-off hole.

2. The gas generator according to claim 1, wherein the gas through-holes in the deposition chamber are arranged in an offset manner to the at least one blow-off hole.

3. The gas generator according to claim 1, wherein the deposition chamber is designed such that the velocity of the gas stream in the deposition chamber decreases in direction of the at least one blow off-hole.

4. The gas generator according to claim 1, wherein the deposition chamber broadens conically in direction of the at least one blow off-hole.

5. The gas generator according to claim 4, wherein all gas through-holes are arranged in an offset manner to the at least one blow-off hole, wherein the at least one blow-off hole is formed in an area of the deposition chamber which is conically broadened in respect to the area forming the gas through-holes.

6. The gas generator according to claim 1, wherein the ratio of the distance (B) of a gas through-hole to the bottom or cover area to the distance (A) of the at least one blow off-hole to the bottom or cover area is in each case larger or equal to 1.5.

7. The gas generator according to claim 1, wherein the gas through-holes of the first wall are formed by holes, elongated holes or dormers.

8. The gas generator according to claim 1, wherein the gas through-holes in the first wall are formed such that gas stream streams out of the first wall essentially in tangential direction into the deposition chamber.

9. The gas generator according to claim 8, wherein the first wall is pivotable mounted in such a manner that the first wall starts to rotate due to the tangential gas discharge.

10. The gas generator according to claim 1, wherein the cross-sectional area of the gas through-holes is larger than the cross-sectional area of the blow off-holes.

11. The gas generator according to claim 1, wherein the cross section of the blow off-holes is determined such that the gas velocity in the blow off-holes is greater than or equal to the sonic speed.

12. The gas generator according to claim 1, wherein the first wall is part of the combustion chamber, defines a boundary of the combustion chamber and is arranged outside of the combustion chamber.

13. A process for depositing solids and liquid burned residues of a gas stream of the gas generator of claim 1, comprising the steps of:
   passing a gas stream through the conically formed deposition chamber, and wherein the gas stream after passing gas through-holes of the first wall of the deposition chamber strikes the second wall of the deposition chamber, thereby undergoing a redirection, subsequently strikes the third wall of the deposition chamber, thereby undergoing a further redirection, and then leaves the deposition chamber through the at least one blow off-hole.

14. The process according to claim 13, wherein the gas stream undergoes after the first redirection a pressure drop caused by the conicity of the deposition chamber, wherein the velocity of the gas stream is reduced.

15. The process according to claim 13, wherein the gas stream is made to rotate around a rotation axis.

16. A gas generator for a vehicle passenger protection device comprising:
   a combustion chamber in which a gas-generating charge is arranged;
   a conical deposition chamber comprising:
      a first wall,
      a plurality of gas through-holes formed in the first wall,
      a second wall which extends at an angle from the first wall, and
      at least one blow-off hole formed in the second wall;
   wherein the gas generator is configured such that gas generated inside the combustion chamber enters the deposition chamber through the gas through-holes and leaves the deposition chamber through the at least one blow-off hole;
   wherein the gas through-holes are formed such in the first wall that the gas streams out of the first wall essentially in tangential direction into the deposition chamber; and
   wherein the first wall is pivotally mounted and configured to rotate when gas streams out of the first wall essentially in tangential direction.

17. A gas generator for a vehicle passenger protection device comprising: a combustion chamber in which a gas-generating charge is arranged;
   a conical deposition chamber comprising: a first wall, a plurality of gas through-holes formed in the first wall, a second wall which extends at an angle from the first wall, and at least one blow-off hole formed in the second wall;
   wherein the cross-sectional area of the gas through-holes is larger than the cross-sectional area of the at least one blow off-hole;
   wherein the gas generator is configured such that gas generated inside the combustion chamber enters the deposition chamber through the gas through-holes and leaves the deposition chamber through the at least one blow-off hole; and
   wherein the first wall is pivotally mounted and configured to rotate when gas streams out of the first wall essentially in tangential direction.

* * * * *